UNITED STATES PATENT OFFICE.

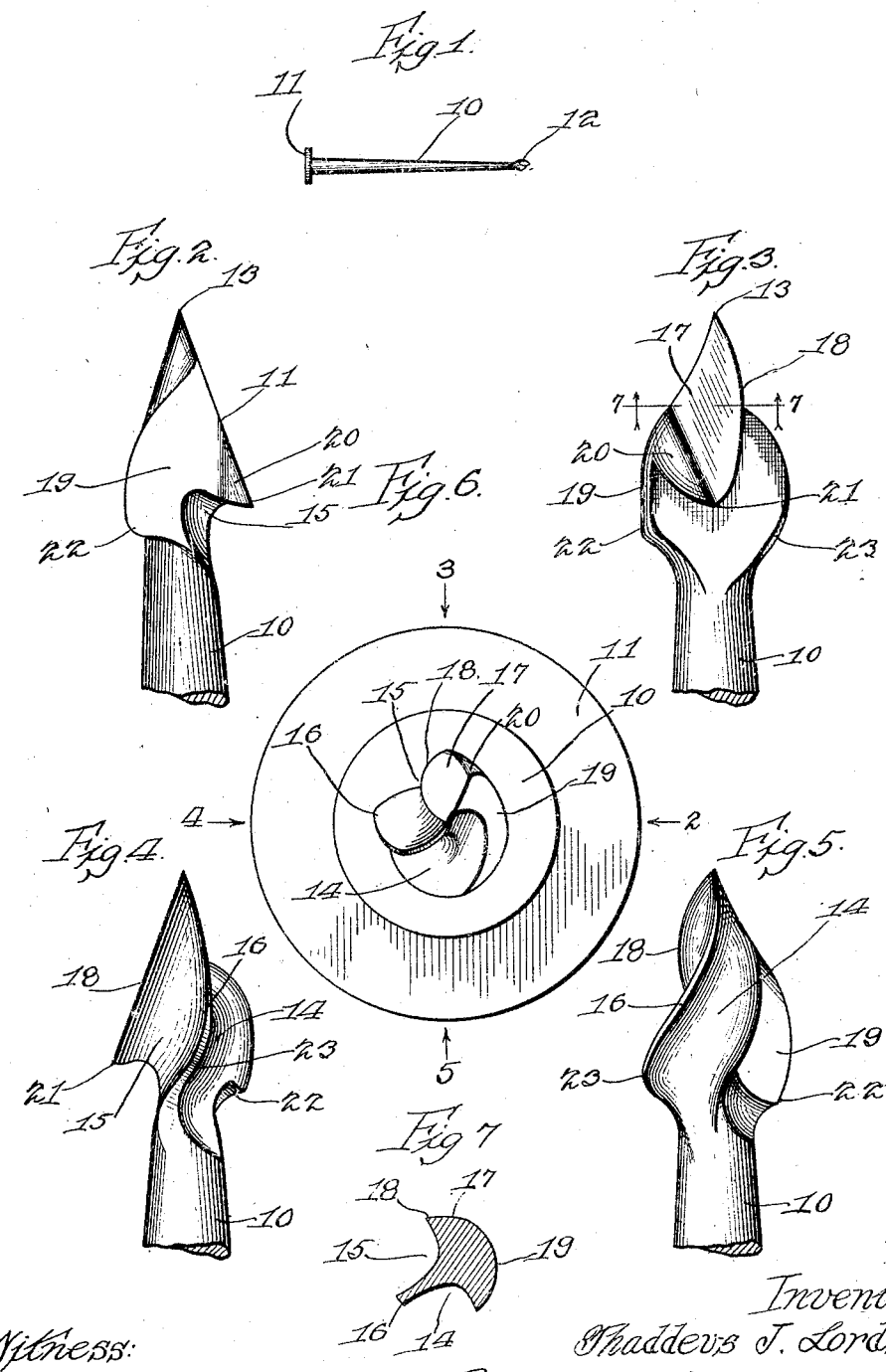

THADDEUS J. LORDS, OF CHICAGO, ILLINOIS, ASSIGNOR TO SEARS, ROEBUCK AND CO., OF CHICAGO, ILLINOIS, A CORPORATION OF NEW YORK.

NAIL.

1,382,005.  Specification of Letters Patent.  Patented June 21, 1921.

Application filed March 5, 1920. Serial No. 363,513.

*To all whom it may concern:*

Be it known that I, THADDEUS J. LORDS, a citizen of the United States, residing at Chicago, in the county of Cook and State of Illinois, have invented certain new and useful Improvements in Nails, of which the following is a specification.

My invention relates to driven fastening devices and more specifically to an improved gimlet nail especially adapted to resist forces tending to withdraw it axially.

Ordinary nails will resist forces transverse to their axis up to and beyond the strength of the materials in which they are ordinarily embedded, but they are relatively unsatisfactory fastening devices where forces tending to withdraw them axially are concerned, as they soon work loose under repeated stresses and slide out rather easily. Ordinary screws, on the other hand, having a tapered shank with a helical thread or groove, offer relatively great resistance to forces tending to withdraw them axially. They are, however, not only much more expensive than nails but very much more work is involved in putting them in.

The need of a device which may be driven into place with a hammer and yet will offer considerable resistance to being pulled out again is particularly pressing in the use of sheet roofing materials either of metal, or paper and asphalt composition. The retainers used for fastening such roofing in place are subjected almost entirely to loads tending to withdraw them axially and perhaps the commonest mishap occurring to such roofing installations is to have the vacuum on the leeward side of the building during a heavy wind lift the entire sheet of roofing material off the boards on which it has been nailed. In addition to this special requirement, the roofing installation is also particularly difficult because a tight joint under the head of the nail where the shank enters the material is indispensable.

The primary object of my invention is to provide a driven fastening adapted to remedy the defects above pointed out by offering a relatively large resistance to axial pull and by forming a tight joint at the head when driven in. While my improved fastening is particularly intended for service of this sort, it will be obvious that it is of general utility and may be used in place of either nails or screws wherever such fastenings have heretofore been employed.

In the accompanying drawings, Figure 1 is a side view of an embodiment of my invention, and Figs. 2, 3, 4 and 5 are enlarged side views of the gimlet point or barb, each being taken after rotating the head 90°. Fig. 6 is an enlarged end view, the arrows 2, 3, 4 and 5 indicating the directions from which the device is to be viewed to secure the showings of Figs. 2, 3, 4 and 5. Fig. 7 is a section on the line 7—7 of Fig. 3.

In the embodiment of my invention selected for illustration, the tapered shank 10 carries an ordinary head 11 at one end, and the barb or gimlet point 12 at the other. Referring to the enlarged figures, the barb comprises essentially an enlargement tapering to a point at 13 and having sides defined by two grooves 14 and 15 separated by a helical rib 16. The outer surface of the enlargement is defined by an almost flat diamond shaped surface 17 which meets the groove 15 to define the leading edge 18 of the protuberance, and a surface portion 19 which is approximately a portion of a true cone with its apex at 13. The extreme projection which would be formed by the meeting of the surfaces 17 and 19 adjacent the butt or heel of the enlargement is relieved, forming a small approximately cylindrical surface 20. The groove 15 at its lower end swings across under the butt of the enlargement dividing it into two projecting heels 21 and 22. Similarly, the groove 14 cuts off the lower end of the helical rib 16 to form a short heel 23. The three heels 21, 22 and 23 are approximately equally spaced both radially and circumferentially with respect to the axis of the nail.

When a nail is driven into a fibrous substance, such as wood, the hole made by it tends to enlarge slightly at opposite sides in the direction of the grain of the wood due to the splitting action of the nail. A nail provided with two diametrically opposite barbs might therefore be withdrawn with comparative ease by getting the heels of the barbs into the oppositely extending cracks formed by splitting the wood, which they would follow up, dragging the lower and smaller portions of the barbs against the walls of the cracks but not securing any real grip to make it necessary to tear fibers in withdrawing the nail. If any two of the barbs of my improved nail lie in a line parallel to the grain of the wood, the third barb will be at right angles to the grain and bite into the fibers where they press hardest against the shank of the nail. Moreover, the other two barbs will be offset from the axis of the shank of the nail and will bite more or less into the fibers on the other side.

As clearly indicated in Figs. 1 and 6, the shank 10 is tapered substantially all the way from the head 11 to the barb 12, and substantially the lower half of the shank 10 is of lesser diameter than the barb. A considerable length of shank smaller than the barb is thus provided, around which the fibers of the wood, slightly lacerated by the passage of the barb, may close tightly to oppose the motion of the barb if the nail is withdrawn. The upper half of the shank 10, however, tapers from a diameter equal to that of the barb 12, to a diameter considerably greater. The radial cuts formed by the barb 12 in its entry into the material will therefore be completely obliterated by the subsequent slow enlargement of the hole as the shank is forced home. This will leave the material under the head 11 tightly jammed and crushed against the shank 10 and the head 11 to provide a water-tight joint.

While I have described and illustrated in detail a specific embodiment of my invention, it should be clearly understood that the description is only for purposes of illustration and that many modifications and variations will naturally occur to those skilled in the art. It will, for instance, be obvious that the shank need not necessarily be round and that the barb illustrated is only one of the many possible embodiments and that the number of heels carried thereby is not limited to three as barbs having one, two, four or any desired number of points fall within the scope of my invention. The taper need not be uniform, the entire length of the shank need not be tapered, and the increase in diameter may occur at any desired portion of the length of the shank, as obviously any shank having a portion adjacent the barb of smaller diameter than the barb, and a portion adjacent the head of larger diameter than the barb, will efficiently perform the desired functions.

I aim in the subjoined claims to cover all such legitimate variations and modifications.

I claim as my invention:

1. A fastening having a tapered shank terminating in a barb, the radial dimensions of said barb being materially greater than the small end of the shank but materially less than the large end of the shank.

2. A fastening comprising a shank and an enlarged barb at the end of the shank, said barb comprising a pointed enlargement and an opposing rib separated from each other by two helical grooves.

3. A fastening comprising a shank and an enlarged barb at the end of the shank, said barb comprising a pointed enlargement and an opposing helical rib, separated from each other by two helical grooves, one of said grooves cutting into the center of the butt of the enlargement to form a pair of spaced heels.

4. A fastening comprising a shank and an enlarged barb at the end of the shank, said barb comprising a pointed enlargement and an opposing helical rib, separated from each other by two helical grooves, one of said grooves cutting under the butt of said helical rib to form a heel.

5. A fastening comprising a shank and an enlarged barb, said barb comprising a pointed enlargement and an opposing helical rib separated from each other by two helical grooves, one of said grooves cutting under the butt of said rib to form a heel, and the other groove cutting under the center of the butt of said enlargement to form a pair of spaced heels.

6. A fastening comprising a shank and an enlarged head, said head comprising a pointed enlargement and an opposing helical rib separated from each other by two helical grooves, one of said grooves cutting under the butt of said rib to form a heel and the other groove cutting under the center of the butt of said enlargement to form a pair of spaced heels, said heels being approximately equally spaced radially and circumferentially with respect to the axis of said fastening.

7. A fastening comprising a head, a barb, and a shank between the two, the portion of said shank adjacent the barb having smaller radial dimensions than the barb, and the portion of said shank adjacent the head having larger radial dimensions than the barb.

8. A fastening comprising, in combination, a shank and a barb at one end of the shank, the cross sectional dimensions of the shank adjacent the barb being materially less than the dimensions of the barb in the same plane and the size of the shank increasing to cross sectional dimensions greater than those of the barb between the barb and the other end of the shank.

In testimony whereof, I have hereunto set my hand.

THADDEUS J. LORDS.